United States Patent [19]
Stimpfl

[11] Patent Number: 5,421,137
[45] Date of Patent: Jun. 6, 1995

[54] PROCESS FOR THE FURTHER HANDLING OF SAUSAGE

[76] Inventor: Christof Stimpfl, Höferweg 2, D-7981 Vogt, Germany

[21] Appl. No.: 71,482

[22] Filed: Jun. 4, 1993

[30] Foreign Application Priority Data

Jun. 6, 1992 [DE] Germany ............ 42 18 783.4
Mar. 11, 1993 [DE] Germany ............ 43 07 637.8

[51] Int. Cl.⁶ .................. A22C 11/00; B65B 5/10
[52] U.S. Cl. ........................... 53/435; 53/236; 53/517; 53/522
[58] Field of Search ........... 53/435, 517, 549, 250, 53/249, 475, 473, 236, DIG. 1, 522; 452/31, 51, 49

[56] References Cited

U.S. PATENT DOCUMENTS

| | | | |
|---|---|---|---|
| 3,620,431 | 11/1971 | Wallace | 452/51 X |
| 3,659,316 | 5/1972 | Berendt et al. | 452/31 |
| 3,716,891 | 2/1973 | Demarest | 452/31 |
| 4,104,763 | 8/1978 | Tetsuro | 452/31 |
| 4,322,871 | 4/1982 | Townsend et al. | 452/31 |
| 4,671,042 | 6/1987 | Moekle et al. | 53/517 X |
| 5,057,055 | 10/1991 | Michaud et al. | 53/517 X |
| 5,102,368 | 4/1992 | Strasser et al. | 452/51 |

Primary Examiner—James F. Coan
Attorney, Agent, or Firm—Bachman & LaPointe

[57] ABSTRACT

In a process for further handling sausages in a sausage string, the sausages are servered from the sausage string at a cutting point. This cutting point is assigned a sensor. The length of the sausage is established ahead of the cutting point by means of the sensor and the point in time of the acting of a cutting element is determined thereby.

31 Claims, 6 Drawing Sheets

PROCESS FOR THE FURTHER HANDLING OF SAUSAGE

The present invention relates to a process for further handling sausages in a sausage string, the sausages being severed from the sausage string at a cutting point and this cutting point being assigned a sensor, and relates to an apparatus for this.

Sausages are today manufactured by filling a casing, whether a natural or synthetic casing, with the corresponding sausagemeat in sausage portions. Between the individual portions, a twisting of the casing and/or a fitting of clips, by which the individual sausages are divided off from one another, is performed. This produces a sausage band, from which later these sausages have to be cut off, for example for automatic packing of a certain number of sausages. Today this is still carried out manually in a very laborious way.

East German Patent 106,131 discloses a device for severing individual sausages from a sausage chain, which comprises two conveying subsystems with in each case a pair of conveyor belts. If a twist between the sausages runs through a sensing system, a severing system is actuated and the twist cut through. This sensing system operates with a light barrier and mirrors and is therefore unsuitable for exact control of the cutting operation at a desired high speed. Such a light barrier is very sensitive to extraneous light, the mirrors are subjected to soiling, making the determinations of severing points very unsatisfactory. This is precisely where the apparatuses known to date fail. Even the cutting device itself, which is designed as a reciprocating cutter, appears to be completely unsuitable for the speeds required today. In terms of safety, the device is questionable, since it displays a valve cut-off, which always returns to the starting position even in the event of a fault.

German Offenlegungsschrift, 3,121,432 further discloses an abovementioned sausage cutting machine, which has a sensor, the radiation source of which sends a beam of electromagnetic waves over the path of the sausages to a sensor. Here too, use is made of mirrors, which easily soil or become covered with a film of grease from the sausages. The cutter and drive of the cutter are completely unsuitable for the high operating speed of a sausage cutting machine required today.

The object of the present invention is to provide a process and an apparatus by means of which an absolutely exact severing of the sausages from a sausage band and also an automatic feeding of the severed sausages to a packing device in the cycle times of this packing device are performed in a simple way.

This object is achieved by the length of the sausage being established ahead of the cutting point by means of the sensor and the point in time of the acting of a cutting element being determined thereby.

This means that the sensor establishes not only the twist point between two sausages, but the overall sausage length. This takes place by establishing a voltage drop and a voltage rise at the twist points between the sausages and the arithmetic mean derived therefrom. This preferably takes place by means of a sensor, which produces an infrared light curtain arranged transversely to the transporting direction of the sausages. However, other, similar sensors are also intended to be covered by the idea of the present invention.

After severing from the sausage string, the sausages are preferably sorted according to their length. It is desired by the consumer that, in a sausage pack, sausages of the same length, as far as possible, are arranged. This means that sausages with an oversize or an undersize are segregated. According to the present process, the size of a reference sausage is first of all input into the control system of the severing and sorting station. Thereafter, the input of a still tolerable oversize or undersize is performed. Sausages which lie within these limits are fed by sorting stations in the sorting device to corresponding receptacles. Sausages which are outside these limits are segregated in further sorting stations in the sorting device.

The sausages of the desired length are preferably collected in containers and transferred automatically according to certain numbers of sausages into a packing unit.

In the case of a corresponding apparatus according to the invention for further handling sausages in a sausage string, the cutting punch is to be preceded by a sensor which produces an infrared light curtain. In this case it is conceivable that, if sorting according to length is not desired, this sensor senses only the position of the severing point between two sausages. In the case of the sensor operating with an infrared light curtain, there is no interference by extraneous light, meaning that the severing point between two sausages can be sensed considerably more accurately.

The sensor preferably comprises an infrared transmitter with light-emitting diodes and an infrared receiver with photodiodes. The transmitter and receiver are arranged transversely to the transporting direction of the sausages on a common line of alignment, so that a curtain of infrared rays is produced. The sensor establishes a voltage drop and a voltage rise and forms the arithmetic mean therefrom. In this way, the severing point is established very exactly, even if clips are arranged between the sausages or the sausages lie very close to one another.

The sausage band is guided between transport elements from an inlet to the cutting point. After the cutting point, the individual sausages are guided between further transport elements to an outlet.

As a result, automation of the entire severing operation is possible. The acting of the cutter at the cutting point must merely be adjusted to the speed of the transport elements, so that an ensured cutting through of a twisted or clipped point of the sausage band always takes place.

How the inlet and outlet are configured is of secondary importance.

The transport elements used may be, for example, appropriate wheels or the like. However, transport elements which are designed as endless toothed belts and wrap around appropriate deflecting rollers are preferred. These toothed belts then lie with their outer surface directed towards each other and hold between them the sausage band or the sausages. Toothed belts have the advantage that they form a long bearing surface and consequently guiding surface for the sausage band or the sausages.

The transport elements ahead of the cutting point are preferably designed as double toothed belts. These double toothed belts have an outer toothing and an inner toothing, the inner toothing coinciding with the toothing of a drive roller. The outer toothing, on the other hand, serves for secured guidance of the sausage band, since the outer teeth press slightly into the surface of the sausage.

On the other hand, the transport elements after the cutting point are designed as single toothed belts, which have only inwardly directed teeth for interacting with a drive roller. This is sufficient, since the individual sausages are easier to guide than a complete sausage band.

A particular advantage of the present invention is that the transport elements ahead of and behind the cutting point are operated at different speeds. The following transport elements run faster than the transport elements ahead of the cutting point. As a result, a tension is exerted on the sausage band, so that the connecting point between two sausages is stretched at the cutting point. Consequently, a greater accuracy and better quality of the cut is accomplished.

The drive of the two pairs of transport elements is of course performed synchronously in each case, it being sufficient here for there to be in each case one motor which drives two deflection rollers via appropriate gear elements. A further feature of the invention is that the spacing between the transport elements is variable. The spacing can be chosen, for example, between 14 mm and 42 mm, meaning that corresponding sausage bands and sausages of this diameter can be handled by the apparatus according to the invention.

The varying of the spacing of the transport elements is preferably performed synchronously in the case of all the transport elements, for which purpose the corresponding deflection rollers are assigned spindles, which in turn are coupled to one another. A single hand wheel then suffices to turn one spindle and, via the one spindle or a corresponding drive belt, also the other spindles. The turning movement of the spindles is then transferred via, for example, worm wheels to corresponding threaded sleeves, which are seated in the deflection rollers. As a result, the deflection rollers then move toward each other or away from each other.

In order that the sausage band or the sausages cannot shift evasively upward, over the free space between the transport elements there are hold-down devices or pressing rollers, which are likewise adjustable in their height and can consequently be adapted to a sausage diameter. For this purpose, these hold-down devices or pressing rollers are in each case suspended on a gallows, a plurality of gallows being seated on a common rotary shaft.

As cutter, use is preferably made of a rotating sickle cutter, which is curved in such a way that the connecting points between two sausages cannot shift evasively. This sickle cutter is fixed on a rotary shaft and runs in a circle, its movement being operated in fixed cycles. The movement of the sickle cutter must, of course, be adjusted to the speed of the drive elements, the sausage length also being a further parameter.

Furthermore, the cutter must be produced very exactly, in order that the least possible unbalance is transferred to the motor. This is desirable with regard to a long service life. Preferably, two sickle blades are arranged rotationally symmetrically.

If the cutter runs between two sausages lying closely next to each other, as far as possible any risk of injury is to be eliminated. For this reason, a taper finish is chosen for the cutting edges of the sickle blades.

A servomotor, which preferably includes an incremental encoder, is used as motor for driving the cutter. This servomotor has the advantage that it does not reach a top speed between the individual cutting cycles and therefore has sufficient time to adjust itself again exactly to zero. As a result, there is very good interaction with the sensor according to the invention.

The entire apparatus is preferably process-controlled, which takes place by a control unit, not shown or described in any more detail. The sausages are also preferably introduced directly into a packing machine, the number of sausages already being counted in the present apparatus according to the invention.

Preferably, the actual severing device is also to be followed by a sorting device. Arranged in this sorting device are sorting stations, which push the sausages, depending on their length, from a transport belt. Sausages of a length within certain limits are preferably fed to a further collecting and transfer device. Sausages with an oversize or undersize are segregated. For this purpose, the sorting stations in the sorting device are coupled to the control system of the severing device and are coupled there in particular to the sensor, which in this case also establishes the length of the respective sausages. The abovementioned sensor which produces an infrared light curtain has proved to be particularly favorable for this purpose as well.

If sausages are packed in a rectangular shell, the collecting and transfer device preferably comprises two container flaps pivotally mounted in a frame and forming a receiving space. As soon as there are a sufficient number of sausages in this receiving space, the container flaps are turned through 90°, so that the bottom of the receiving space is opened and the sausages drop into the container shell.

Difficulties arise in particular when filling a can, a jar or the like. Even today, this is generally performed manually. The present invention offers a solution here which can be used in the case of any already known apparatus for packing sausages, but preferably in the case of the apparatus according to the invention. Therefore, protection is being sought separately for this device. In the case of this device according to the invention, two container shells, connected by means of a joint, form a tubular container. This tubular container has a slit in its circumferential surface, in order that the container shells can be opened. Provided opposite this slit is a joint, about which the two container shells can turn. For receiving the sausages, the container shells are folded open. For transferring the sausages into a can, they are closed, i.e, a tubular container is produced. In this arrangement, a very favorable aligning of sausages possibly lying askew is performed simultaneously inside the container.

An ejecting plate, which is preferably actuated pneumatically, is provided for ejecting the sausages into a can. For the sake of simplicity, the opening and closing of the container is carried out by one, preferably two, slotted-link frames, which has/have a wedge-shaped notch. The container is mounted in this wedge-shaped notch. Upon raising out of the bottom of the notch, the container shells open automatically, whereas they close upon entering into the notch.

For filling, the can itself is brought into a position in which the longitudinal axis of the can is aligned approximately with the longitudinal axis of the container. In this position, the can is held between a clamping strip and supporting fingers. Furthermore, the can is guided between guide rods in such a way that, for filling, it is located in a horizontal position, but thereafter is transferred by the guide rods into an upright position and is set down on a corresponding transport belt. These cans may subsequently be closed by lids or sealed in some other way.

Further advantages, features and details of the invention emerge from the following description of preferred exemplary embodiments and with reference to the drawing, in which.

Figure 1:
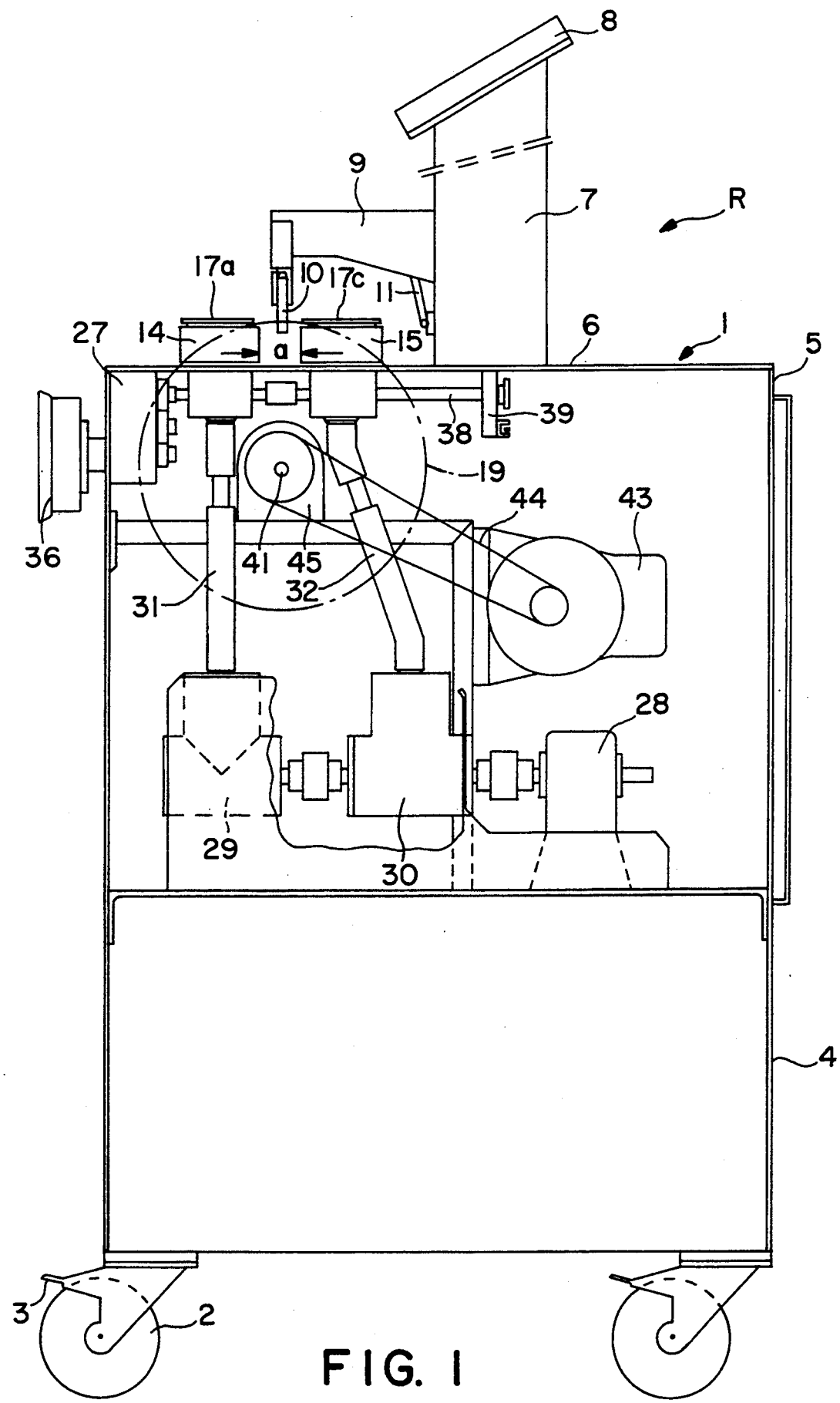
FIG. 1 shows a side view, represented as partly broken open, of an apparatus according to the invention for severing sausages.

An apparatus R according to the invention for severing sausages which are produced in the form of a band has a housing case 1, which can move on rollers 2. These rollers 2 can be fixed by means of braking levers 3. Furthermore, the housing case 1 essentially comprises a lower cabinet 4 and an upper part 5, which latter contains major functional elements for the operation of the apparatus according to the invention. It goes without saying that both lower cabinet 4 and upper part 5 are covered by appropriate side plates etc. All that is essential in this arrangement is the upper covering of the upper part 5, which serves as a sliding surface 6 for a sausage band.

Set up on a column 7 on the sliding surface 6 is a display 8, which includes an indicator or an input panel, not specified in any more detail, for the control of the apparatus R.

From the column 7 there protrudes furthermore a gallows 9, which holds a pressing roller 10, which in the position for use presses the sausage band against the sliding surface 6. The gallows 9 is adjustable in its height or location, for which purpose a lifting cylinder 11, only indicated, is provided.

Figure 2:
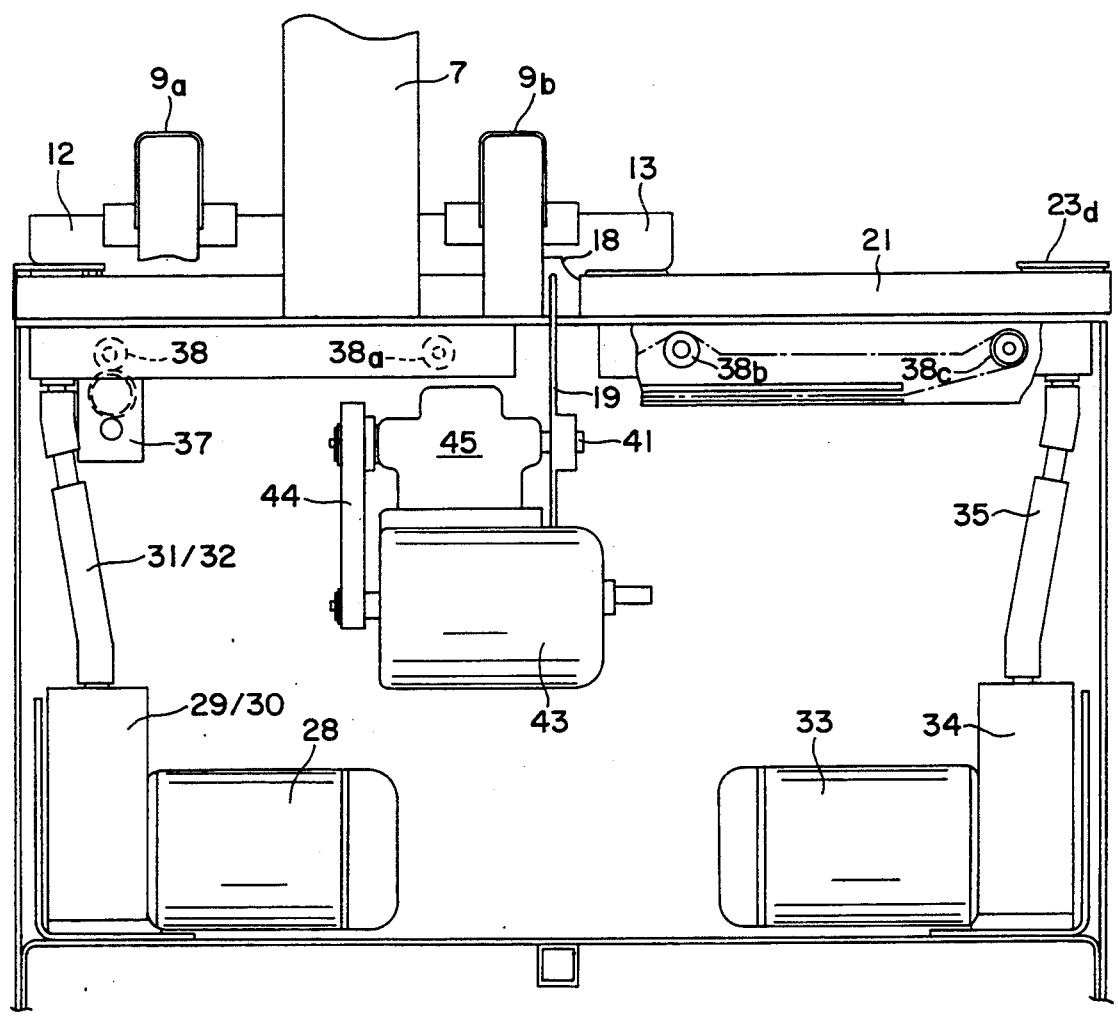
FIG. 2 shows a further side view, represented as partly broken, of an opened apparatus according to FIG. 1.
Figure 3:
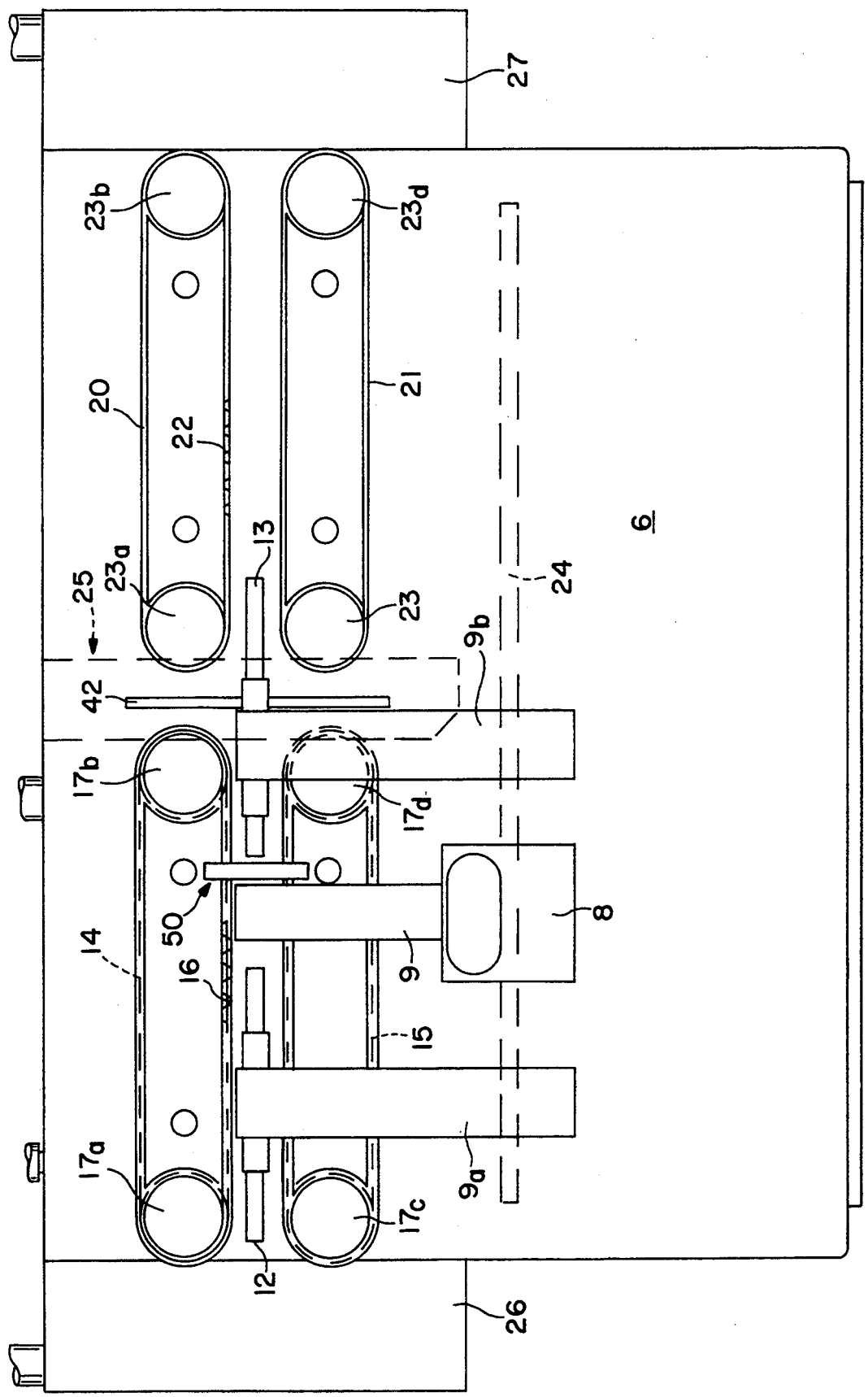
FIG. 3 shows a plan view of the apparatus according to FIG. 1.

According to FIGS. 2 and 3, next to the column 7 on the left and right there are, moreover, further gallows 9a and 9b, rail-shaped hold-down devices 12 and 13 being provided on these gallows 9a and 9b. These hold-down devices 12 and 13, and also the pressing roller 10, engage between two transport belts 14 and 15, which are arranged at a variable spacing a from each other. As indicated in FIG. 3, all the gallows 9, 9a and 9b are arranged on a common rotary shaft 24, so that they can for example also be raised or lowered jointly by a lifting cylinder 11.

As indicated in FIG. 3, the transport belts 14 and 15 are designed as endless double toothed belts, these double toothed belts having a both inwardly and outwardly directed toothing 16. With the inwardly directed toothing, the transport belts 14 and 15 wrap around deflection rollers 17a, 17b, 17c and 17d, whereas the sausage band, not shown in any more detail, is guided by the teeth of the double toothed belt directed toward one another. As a result, a good securing of the sausage band between the two transport belts 14 and 15 takes place.

The hold-down device 13 extends over a cutting point 25, which in FIG. 3 is indicated only by dashed lines. In the region of this cutting point 25, the hold-down device 13 has a shaped recess 18, which can be passed through by a cutter 19.

The cutter 19 must meet particular requirements, since the apparatus operates with approximately 480 cuts per minute and each cut has to be executed very exactly, in spite of the ununiformshape of the sausages, in order that no sausage is damaged.

Firstly, the cutter is seated directly on a shaft of a servomotor, described later. Secondly, the cutter itself is to a great extent of a rotationally symmetrical design and has two sickle blades 57a and 57b, with in each case a cutting edge 58. Into the recess for fitting the cutter 19 onto the shaft there is shaped furthermore a fitting groove 59.

The cutter 19 must be eroded absolutely exactly, no regrinding takes place. As a result, exact concentricity is retained. Only the mass of the cutter itself acts on the motor, meaning that a high service life of the motor is to be expected.

Figure 6:
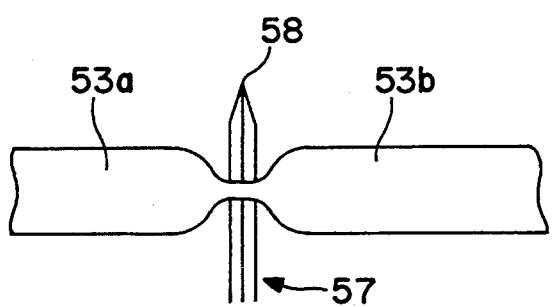
FIG. 6 shows a partly represented cross section through the cutter according to FIG. 5 in a position for use.

It can be seen furthermore from FIG. 6 that the cutting edge 58 has a taper finish, i.e. the cutting edge 58 is produced by grinding the respective sickle blade 57 on both sides. If sausages 53a and 53b lie very closely next to each other, they are forced apart by the cutting edge 58 according to the invention, without any damage taking place.

The cutting point 25 is followed by two further transport belts 20 and 21, which however are provided as single toothed belts with an only inwardly directed toothing 22. Here too, again corresponding deflection rollers 23 are provided. These transport belts 20 and 21 serve for further transporting individually the sausages severed from the sausage band at the cutting point 25. For guiding the sausage band or the severed sausages, there is indicated on the left according to FIG. 3 a rounded-off inlet 26 and on the right a rounded-off outlet 27.

According to the invention, the pairs of transport belts 14/15 and 20/21 are, moreover, driven at different speeds. The pair of transport belts 20/21 has a slightly increased speed in comparison with the pair of transport belts 14/15, meaning that the sausage band is stretched slightly in the region of the cutting point and thus an ensured cut can take place.

A motor 28, which is connected to the deflection roller 17a and 17c, respectively, via in each case a gear mechanism 29 and 30 and corresponding joints 31 and 32, serves for driving the pair of transport belts 14/15. As a result, a synchronous driving of the two deflection rollers 17a and 17c takes place. For the deflection rollers 23b and 23d there is also provided a motor 33 with corresponding gear mechanism 34 and joints 35. As mentioned above, the motors 28 and 33 are operated at different speeds.

A varying of the spacing a of the transport belts 14/15 and 20/21, respectively, is performed by means of a movement of the deflection rollers 17 and 23, respectively, this movement likewise being carried out synchronously. Serving for this purpose is a hand wheel 36, which is connected to a spindle 38 via a transmission gear mechanism 37. On the other side of the transmission gear mechanism 37, the spindle 38 is held in a bearing block 39. Each deflection roller 17 and 23 is assigned such a spindle 38, 38a, 38b and 38c, all the spindles 38 being connected jointly by means of a drive belt. The transfer of the rotary movement of the spindle 38 to the deflection roller 17 or 23, respectively, is performed in a known way via, for example, worm wheels with appropriately set toothing.

The cutter 19 is preferably designed as a sickle cutter and is rotatably mounted on a shaft 41, the said cutter running around a circle which in FIG. 1 is only indicated by dot-dashed lines. During its movement, the cutter 19 also passes through a slit 42 in the sliding surface 6 between the pairs of transport belts 14/15 and 20/21. As it does so, it breaks through the connecting points of two sausages which are in a sausage band. If the sausages are separated by clips, these clips are knocked off. If there are two clips at the severing point, cutting through takes place between the two clips.

The rotational movement of the cutter 19 is generated by a servomotor 43, which is connected via a drive belt 44 to a gear mechanism 45, from which the rotary shaft 41 for the cutter 19 protrudes. An incremental encoder is preferably integrated in the servomotor 43. Control is performed in such a way that the motor does not reach its top speed, so that it has sufficient time to adjust itself to zero after each cut.

The use of a servomotor has the advantage that it always adjusts accurately to zero, to be precise in the range of thousandths. This is necessary in order that sausages which are transported through the apparatus at a speed of up to 870 mm/sec are cut exactly. The apparatus is in this case designed for a continuous rate of approximately 480 cuts per minute.

Figure 4:
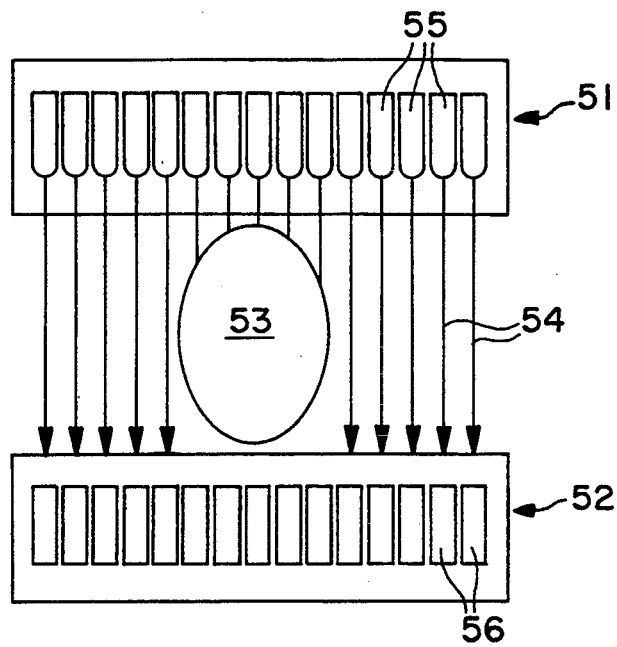
FIG. 4 shows a diagrammatic representation of a sensor according to the invention.
Figure 5:
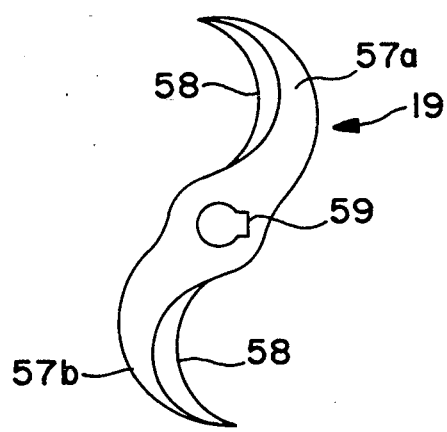
FIG. 5 shows a plan view of a cutter according to the invention for use in an apparatus according to FIG. 1.

The cutting point 25 is preceded by a sensor 50, by means of which the servomotor 43 is activated. In this case, the sensor is arranged approximately 100 mm in front of the slit 42. As represented in FIG. 4, the sensor 50 comprises an infrared transmitter 51 and an infrared receiver 52. Both are arranged transversely to the conveying direction of a sausage 53. The infrared transmitter 51 produces by light-emitting diodes 55 a multiplicity of rays 54 of a light barrier, through which the sausage 53 passes. The light-emitting diodes 55 are arranged on a common line of alignment and thus produce an infrared light curtain, which is about 100 mm long.

The infrared light curtain meets photodiodes 56 of the infrared receiver. Depending on the irradiated area, these photodiodes supply a series resistance for a network of resistors connected in parallel, so that ultimately the current established after the resistors is an image of the irradiated area. By means of corresponding circuit elements, this current produces a voltage drop, which is fed to an analog-digital convertor. There, the analog value is digitized and an arithmetic mean-value calculation is carried out.

Consequently, establishing of a voltage drop and of a voltage rise in the area between two sausages and also establishing whether one or two clips are present takes place by means of this sensor 50 according to the invention. The sensor 50 in this case projects laterally over the sausage 53 with light-emitting diodes and photodiodes, which serve for more accurate resolution. Although they are active, they are inactive in their effect on the sausage area.

If a plurality of sensors 50 are in operation next to one another, they may be operated at different frequencies in order that they do not interfere with one another.

Figure 7:
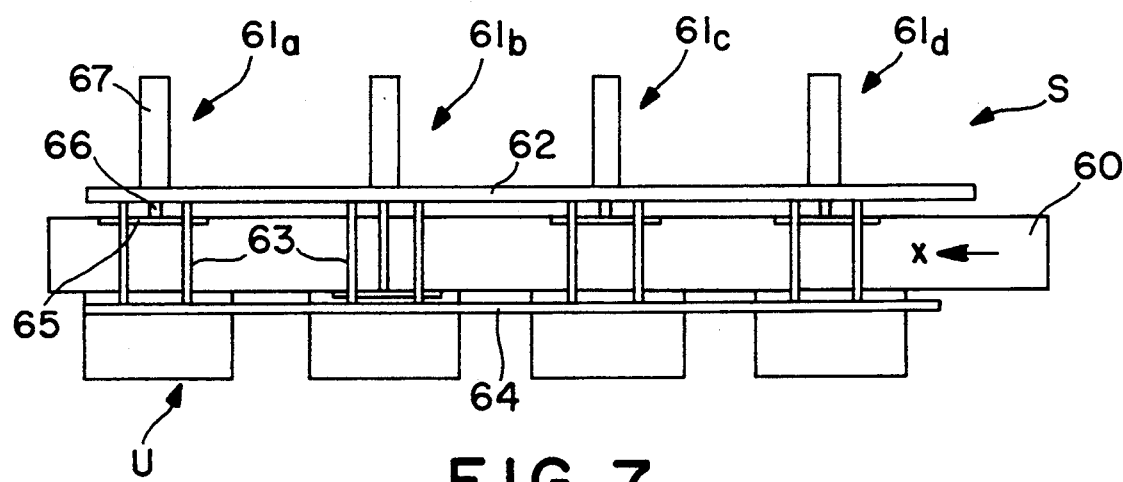
FIG. 7 shows a plan view of a sorting device according to the invention.

In a preferred exemplary embodiment, the apparatus R for severing sausages is followed by a sorting device S according to FIG. 7. This sorting device S has a transport belt 60, which is arranged underneath a row of sorting stations 61a to 61d. These sorting stations 61 are located on a carrying frame 62. The carrying frame 62 is connected to a front strip 64 by means of transverse bars 63. Further rack parts are not shown.

Each sorting station 61 has a pushing plate 65, which is arranged on a piston rod 66 of a pneumatic cylinder 67. The pushing plate 65 is able to move by means of the piston rod 66 transversely to a conveying direction x of the transport belt 16, so that sausages guided on the transport belt 60 can be ejected laterally by the pushing plate 65. They then drop into collecting and transfer devices U.

According to the invention, the length of a reference sausage is established by means of the sensor 50. Furthermore, a tolerable oversize or undersize for the sausage is input in the control system. Sausages which lie within these limits are, for example, ejected from the sorting station 61b and 61c and drop into the collecting and transfer unit U. Sausages which, on the other hand, exceed a permissible size, are transported past the sorting stations 61b and 61c as far as the sorting station 61a, and only there are ejected. Sausages which, in turn, are below a certain size, are already ejected by the sorting station 61d. As a result, it is ensured that sausages of approximately the same length are passed on for further packing.

Figure 8:
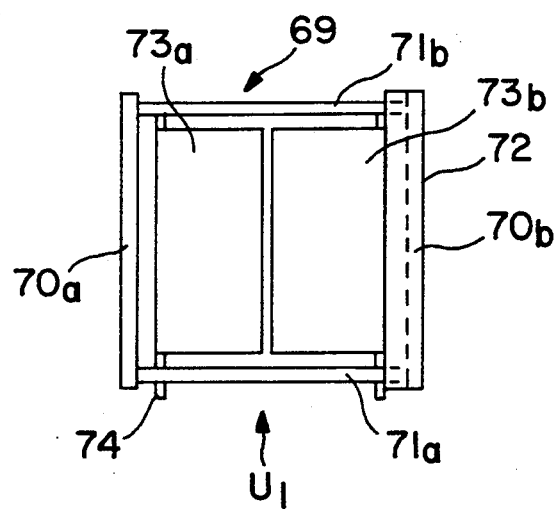
FIG. 8 shows a plan view of a collecting and transfer device according to the invention.
Figure 9:
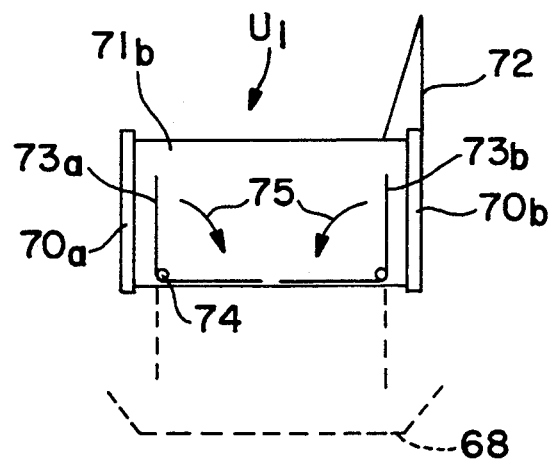
FIG. 9 shows a front view of the opened collecting and transfer device according to FIG. 8.

A collecting and transfer device $U_1$ is represented in FIGS. 8 and 9. This is a collecting and transfer device with the aid of which sausages can be collected parallel to one another and transferred into, for example, a shell 68. This shell 68 may then, for example, be sealed by means of a plastic film.

The collecting and transfer device $U_1$ according to the invention comprises a rectangular frame 69 with side walls 70a and 70b and also end walls 71a and 71b. On the side wall 70b there is also provided a baffle wall 72, which can divert sausages into a receiving space, which is formed by container flaps 73a and 73b. Both container flaps 73a and 73b are mounted pivotally by means of spindle journals 74 in the end walls 71a and 71b, these spindle journals 74 being assigned a drive, not shown in any more detail. By means of this drive, a turning of the spindle journal 74 in the direction of the arrows 75 can take place, so that the container flaps 73 open the receiving space downward, as is indicated in FIG. 9 by dashed lines. As this happens, the sausages drop into the shell 68. As soon as the receiving space has been emptied, the container flaps 73 return again into their starting position and form the receiving space for new sausages.

Figure 10:
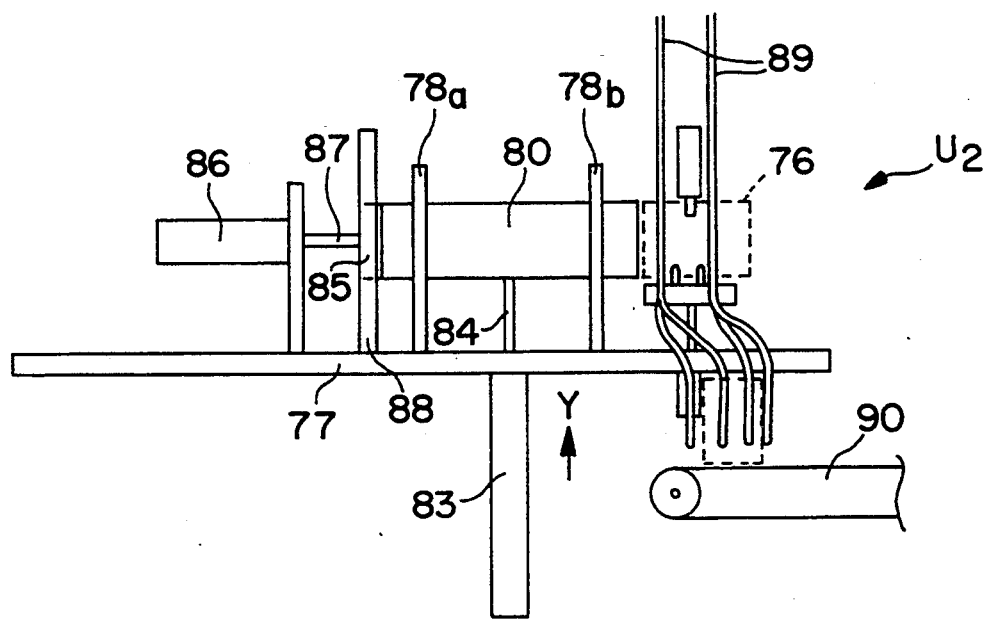
FIG. 10 shows a side view of a further collecting and transfer device according to the invention.
Figures 11, 12:
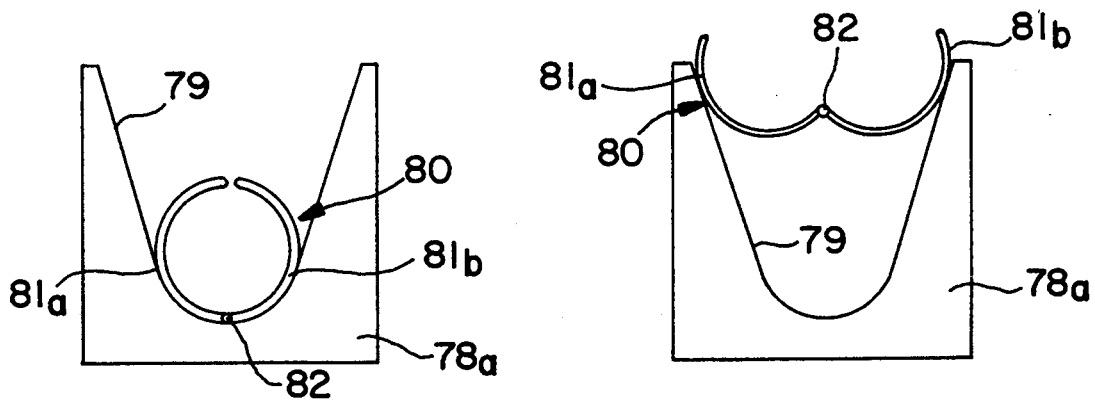
FIG. 11 shows a cutout from the collecting and transfer device according to FIG. 10.
FIG. 12 shows a cutout from the collecting and transfer device according to FIG. 10 in a further position for use.

In FIGS. 10 to 13 a collecting and transfer device $U_2$ and parts thereof is shown, by means of which sausages could be collected and introduced into a can 76, jar or the like. For this purpose, two slotted-link frames 78a and 78b, which guide a tubular container 80 in a wedge-shaped notch 79 (see FIGS. 11 and 12), are seated on a carrying plate 77. This tubular container 80 has two container shells 81a and 81b, which are connected to each other by means of a joint 82. In the receiving position for sausages according to FIG. 12, the container shells 81 are open. Once there are sufficient sausages in the container 80, the container 80 slides downward in the wedge-shaped notch 79 and closes as it does so, as is shown in FIG. 11. A corresponding lifting movement y of this container 80 is accomplished by a cylinder 83, preferably a pneumatic cylinder, which is arranged on the carrying plate 77 and the piston rod 84 of which acts on the container 80.

In the closed position of the container 80, shown in FIG. 11, said container is located in front of an ejecting plate 85, by means of which the sausages located in the container 80 can be ejected into the can 76. This is accomplished by means of a further cylinder 86, which is connected to the ejecting plate 85 by means of a piston rod 87.

In the position of rest, the ejecting plate 85 is located in a wall 88, which prevents sausages falling out of the container 80 at the side.

The cans 76 are transported between guide rods 89 to the transfer position indicated by dashed lines in FIG. 10. After the transfer position, the guide rods 89 form a cage such that the previously horizontally arranged can 76 is turned through approximately 90° and is deposited on a further transport belt 90.

Figure 13:
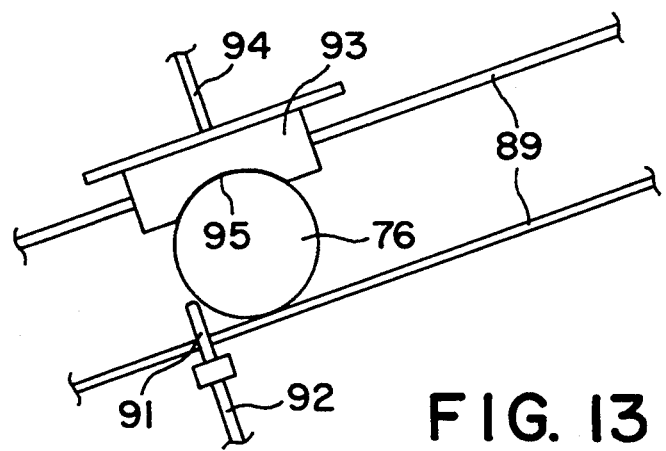
FIG. 13 shows a further cutout from the collecting and transfer device according to FIG. 10.

In the transfer position, the can 76 is held, according to FIG. 13, by supporting fingers 91, which avoid further rolling of the can 76. These supporting fingers 91 can be removed from the rolling area of the can 76 between the guide rods 89 by means of a piston rod 92. As a result, the can 76 is released and can be turned and deposited on the transport belt 90 by means of the guide rods 89.

An additional securing of the can 76 in the transfer position is performed by a clamping strip 93, which can likewise be moved by means of a piston rod 94 and a cylinder, not shown in any more detail. This clamping strip 93 has a hollow 95, which is adapted approximately to the contour of the can 76. In this way, the can 76 is securely held in the transfer position. After filling of the can 76, the clamping strip 93 is raised and the supporting fingers 91 are lowered, so that the can 76 is free between the guide strips 89.

I claim:

1. A process for handling sausages connected in a sausage string, including the steps of:
    transporting the sausages via transport elements to a cutting point;
    sensing a twist point between two sausages via a sensor prior to the cutting point, wherein the sensor determines a voltage drop and a voltage rise at the twist point between the two sausages;
    determining via the speed of the transport elements and the sensing of the twist point, the point in time for activating a cutting element; and
    cutting the sausage at the twist point via the cutting element.

2. The process according to claim 1, wherein the sensor formulates an arithmetic means indicating the central point of the twist point via the sensed voltage drop and voltage rise detected at the twist point.

3. The process as claimed in claim 1, further comprising the step of the sensor calculating the length of the sausages via the detection of the twist points and the speed of the transport elements.

4. The process according to claim 1, wherein the sensor comprises an infrared light curtain arranged transversely to the transporting direction of the sausages.

5. The process according to claim 3, further comprising the step of sorting the sausages according to their length after cutting.

6. The process according to claim 5, further comprising the steps of:
    comparing the length of sausages to known oversized and undersized lengths stored in a control system;
    transporting the sausages to sorting stations of a sorting device; and
    sorting out the oversized and undersized sausages via the sorting stations and the known lengths.

7. The process according to claim 6, further comprising the step of collecting the sausages in containers and transferring the sausages automatically in groups to a packing unit.

8. An apparatus for handling sausages connected in a sausage string, comprising:
    means for transporting the sausages to a cutting point;
    means for sensing a twist point located between two sausages, wherein the means for sensing is positioned upstream of the cutting point and the means for sensing determines a voltage drop and the voltage rise at the twist point between the two sausages, the means for sensing including means for calculating the point in time for cutting the sausages during transport, wherein the means for calculating determines the point in time via the speed of the means for transporting and the sensing of the twist point; and
    cutting means for cutting the sausages at the twist point via a signal from the means for sensing.

9. The apparatus according to claim 8, wherein the means for sensing is comprised of an infrared transmitter having light omitting diodes and an infrared receiver having photodiodes.

10. The apparatus according to claim 9, wherein the transmitter and receiver are arranged in planar alignment, transversely to the transporting direction of the sausages.

11. The apparatus according to claim 8, wherein the means for sensing senses a voltage drop and a voltage rise at the interface between the sausage and twist point, the means for sensing further including means for determining the arithmetic mean of the length of the twist point.

12. The apparatus according to claim 8, wherein the means for transporting comprises transport elements positioned before and after the cutting means, wherein the transport elements positioned before the cutting means are comprised of double tooth belts having inwardly and outwardly directed teeth and the transport elements positioned after the cutting means are comprised of single tooth belts having inwardly directed teeth.

13. The apparatus according to claim 12, wherein the transport elements positioned before the cutting means are driven at a different speed than the transport elements positioned after the cutting means.

14. The apparatus according to claim 13, wherein two deflection rollers are located adjacent the transport elements positioned before and after the cutting means, wherein the two deflection rollers are driven jointly by a motor.

15. The apparatus according to claim 12, wherein the transport elements are variably spaced.

16. The apparatus according to claim 15, wherein each deflection roller has a spindle and each spindle is coupled to a gear mechanism common to the other spindles, and wherein a drive is connected to the gear mechanism.

17. The apparatus according to claim 8, wherein each transport element has at least one pressing roller for holding the sausages on a sliding surface.

18. The apparatus according to claim 17, wherein the rollers are arranged on gallows which are fixed to a common rotary shaft.

19. The apparatus according to claim 8, wherein the cutting means is a sickle cutter fixed on a shaft, the shaft being connected via a gear mechanism to a motor, and wherein the sickle cutter is adapted to pass through a slit in the sliding surface upon actuation thereof.

20. The apparatus according to claim 19, wherein the sickle cutter comprises two rotationally connected and symmetrically arranged sickle blades.

21. The apparatus according to claim 19, wherein the cutter has a cutting edge with a taper finish.

22. The apparatus according to claim 19, wherein the motor is a servomotor which operates in fixed cycles.

23. The apparatus according to claim 8, wherein a sorting device is positioned downstream of the cutting means.

24. The apparatus according to claim 23, wherein the sorting device includes sorting stations which are adapted to push the sausages from the transport elements depending on their length.

25. The apparatus according to claim 24, wherein the sorting stations are coupled in a control-related manner to the sensing means.

26. The apparatus according to claim 23, wherein the sorting device is followed by a collecting and transfer unit, wherein the unit collects the sausages and transfers the sausages to a container.

27. The apparatus according to claim 26, wherein the collecting and transfer device comprises two container flaps pivotally mounted on a frame and forming a receiving space.

28. A collecting and transfer device for receiving and moving sausages into a container, comprising:
means for transporting the sausages to an ejecting station;
an ejecting plate comprising the ejecting station for ejecting the sausages into a container; and
wherein the container comprises two shells coupled together by means of a joint.

29. The collecting and transfer device according to claim 28, wherein the container is slidably mounted in a wedge-shaped notch of a slotted-link frame, and wherein the container carries out a lifting movement by opening and closing.

30. The collecting and transfer device according to claim 28, further including guide means for transferring the container from a horizontal position to an upright position.

31. The collecting and transfer device according to claim 30, wherein the container is held by a clamping strip and supporting fingers during filling.

* * * * *